United States Patent
Shamshoum et al.

(12) 
(10) Patent No.: US 6,211,109 B1
(45) Date of Patent: Apr. 3, 2001

(54) PROCESS FOR TREATING SILICA WITH ALUMOXANE

(75) Inventors: Edwar S. Shamshoum, Houston; Christopher G. Bauch, Seabrook; B. R. Reddy, Baytown; David J. Rauscher, Angleton; Kevin P. McGovern, Friendswood, all of TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/085,922

(22) Filed: May 28, 1998

Related U.S. Application Data

(62) Division of application No. 08/503,763, filed on Jul. 18, 1995, now abandoned.

(51) Int. Cl.$^7$ .............................. B01J 31/12; C08F 4/02
(52) U.S. Cl. .................. 502/152; 502/263; 526/129; 526/351; 526/943
(58) Field of Search .................................. 502/104, 105, 502/107, 111, 152, 232, 263; 526/904, 129; 423/335; 501/133, 153, 154

(56) References Cited

U.S. PATENT DOCUMENTS

| | | | |
|---|---|---|---|
| 5,219,968 | | 6/1993 | Shiomura et al. ............... 526/283 |
| 5,225,507 | | 7/1993 | Asanuma et al. ................ 526/279 |
| 5,240,894 | * | 8/1993 | Burkhardt et al. .............. 502/108 |
| 5,252,529 | * | 10/1993 | Ueda et al. ..................... 502/113 |
| 5,455,316 | * | 10/1995 | Tsutsui et al. .................. 526/114 |
| 5,719,241 | * | 2/1998 | Razavi et al. .................. 526/119 |

OTHER PUBLICATIONS

Handbook of Chemistry and Physics, Chemical Rubber Company, 53rd Edition, p. C–512, 1973.*

* cited by examiner

Primary Examiner—David W. Wu
Assistant Examiner—R. Rabago
(74) Attorney, Agent, or Firm—Jim D. Wheelington

(57) ABSTRACT

The invention provides a process for commercial production of syndiotactic polyolefins using a metallocene catalyst supported on silica treated with MAO. The invention includes contacting the supported metallocene catalyst with an aluminum alkyl and aging the catalyst prior to polymerization. In addition, the catalyst is prepolymerized in a tubular reactor prior to being introduced into the polymerization reaction zone. The treated silica is produced by removing water to a level of 0.5–1.08%, slurrying in a nonpolar solvent, adding an alumoxane, heating to reflux, cooling the slurry, and separating the solid product.

7 Claims, 1 Drawing Sheet

PROCESS FOR TREATING SILICA WITH ALUMOXANE

This application is a division of copending application Ser. No. 08/503,763, filed on Jul. 18, 1995, now abandoned.

BACKGROUND OF THE INVENTION

1. Field of the Invention

This invention relates to a catalyst and process for polymerization of olefins. A supported metallocene catalyst is made by treating a support with an alumoxane co-catalyst and complexing a metallocene with the alumoxane. The supported metallocene catalyst is suspended in a diluent. Prior to the introduction into a polymerization reaction zone, the supported metallocene catalyst is contacted with an aluminum alkyl co-catalyst.

2. Description of the Prior Art

Catalysts for the syndiotactic polymerization of olefins are known in the art and have been known at least since U.S. Pat. No. 3,305,538, which described use of a catalyst to produce small quantities of syndiotactic polypropylene which were extracted. Since that time, patents have issued relating to organometallic or metallocene catalysts which produce syndiotactic polyolefins. Examples of these patents include U.S.

Pat. Nos. 4,892,851; 5,132,381; 5,187,250; 5,219,968 and 5,225,507, the disclosures of which, together with the disclosure of U.S. Pat. No. 3,305,538, are hereby incorporated by reference.

These patents disclose metallocene catalysts that are basically a complex derived from a cyclopentadiene, i.e., a metal derivative of cyclopentadiene, which has been ionized by an ionizing agent to form an active cationic metallocene catalyst. It has also become known in the art that metallocenes may be supported on an inert non-reactive material.

In the U.S. Pat. No. 4,701,432 a support is treated with at least one metallocene and at least one non-metallocene transition metal compound. To form a catalyst system a co-catalyst comprising an alumoxane and an organometallic compound of Group IA, IIA, IIB and IIIA is added to the supported metallocene/non-metallocene. The support is a porous solid such as talc or inorganic oxides or resinous materials, preferably an inorganic oxide, such as silica, alumina, silica-alumina, magnesia, titania or zirconia, in finely divided form. By depositing the soluble metallocene on the support material it is converted to a heterogeneous supported catalyst. The transition metal compound, such as $TiCl_4$, is contacted with the support material prior to, after, simultaneously with or separately from contacting the metallocene with the support.

In U.S. Pat. No. 4,897,455 a metallocene and an alumoxane were reacted in the presence of a support material to provide a supported metallocene-alumoxane reaction product as a catalyst to polymerize olefins, preferably ethylene. The support is a porous solid, such as talc, inorganic oxides and resinous support materials, such as a polyolefin, and is preferably silica, alumina, silica-alumina and mixtures thereof.

In U.S. Pat. No. 4,935,397 a silica gel having a particle size less than 10 microns containing from about 5 to about 20 per cent by weight absorbed water as a catalyst support material. The silica gel is coated with alumoxane and a metallocene is complexed with the alumoxane to form a catalyst which can be used in high pressure and/or high temperature olefin polymerization.

In U.S. Pat. No. 5,200,379 pentadienyl derivatives were complexed with transition metals to form a catalyst which is supported on activated inorganic refractory compounds, preferably inorganic oxides and metal phosphates, such as silica and alumina. The inorganic refractory compounds are activated by calcining in air at elevated temperatures and then contacted with a pentadienyl derivative—transition metal complex, such as bis(2,4-dimethylpentadienyl) titanium. The supported catalyst can be used in olefin, preferably ethylene, polymerization.

In U.S. Pat. No. 5,240,894 a metallocene is activated with methylalumoxane (MAO) to form a reaction product which is contacted with dehydrated silica. After drying, a supported catalyst is formed which can be used in polymerization of olefins, particularly propylene, a trialkylaluminum co-catalyst or scavenger can be used in polymerization to minimize fouling and increase catalyst activity.

SUMMARY OF THE INVENTION

The invention provides a process for syndiotactic propagation in the polymerization of olefins, particularly propylene. In one embodiment, the invention comprises forming a suspension of the supported metallocene catalyst in an inert liquid carrier, such as mineral oil, contacting the supported metallocene catalyst with a trialkylaluminum, such as tri-isobutyl aluminum, co-catalyst and introducing the catalyst into a polymerization reaction zone which contains a monomer solution. A preferred embodiment includes forming a supported metallocene catalyst on an inert, non-reactive support, such as silica.

In another embodiment, the invention comprises pre-polymerizing the catalyst with the co-catalyst and an olefin. The olefin is added after the catalyst has contacted the co-catalyst. The catalyst is then introduced into the reaction zone. It is preferred to have a stream of olefin contact the catalyst and co-catalyst and carry the catalyst into the reaction zone.

In another embodiment of the invention, the catalyst is contacted with the co-catalyst, for a certain period of time. The catalyst and co-catalyst are suspended in an inert liquid carrier, such as mineral oil. The catalyst is then contacted with an olefin prior to introducing the catalyst into the reaction zone.

In the pre-polymerization step, the catalyst may be coated with a polymer product such that the weight ratio of polymer/catalyst is approximately 0.01–3.0. Preferably, the ratio of coating the catalyst is greater than 1.0 and, more preferably, 2.0–3.0. The preferred olefin is propylene.

The preferred catalyst comprises a metallocene compound of the general formula:

where R" is a bridge imparting stereorigidity to the structure to the metallocene by connecting the two cyclopentadienyl rings, b is 1 or 0 indicating whether the bridge is present or not, Cp is a cyclopentadienyl ring, R and R' are substituents on the cyclopentadienyl rings and can be a hydride or a hydrocarbyl from 1–9 carbon atoms, each R and R' being the same or different, each $(CpR_{5-b})$ and $(CpR'_5-b)$ being different so that bilateral symmetry exists, M is a Group IIIB, IVB, VB or VIB metal, R* is a hydride, a halogen or a hydrocarbyl from 1–20 carbon atoms, v is the valence of M. The preferred co-catalyst is an alkylaluminum compound, and most preferably tri-isobutyl aluminum.

BRIEF DESCRIPTION OF THE DRAWINGS

A more complete appreciation of the invention and many of the attendant advantages thereof will be readily understood by reference to the following detailed description when considered in connection with the accompanying drawing wherein.

DETAILED DESCRIPTION OF THE INVENTION

Figure 1:
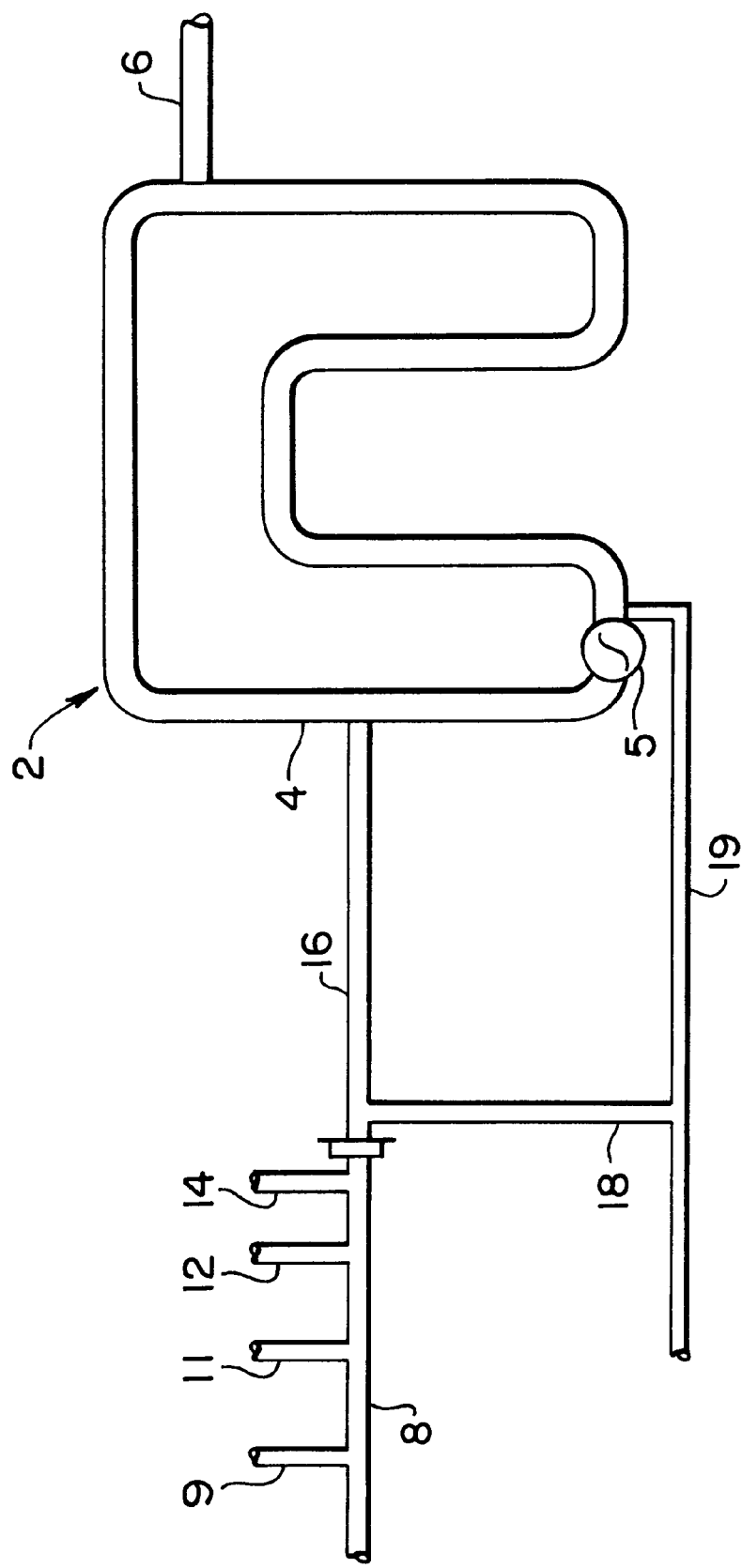
FIG. 1 is a schematic illustration of the invention as used in supplying a prepolymerized catalyst system to a continuous flow reactor used for the polymerization of propylene in the liquid phase.

The present invention provides a process for syndiotactic propagation in the polymerization of α-olefins. The invention is particularly adapted for the polymerization of propylene. The invention includes contacting the supported metallocene catalyst with an aluminum alkyl co-catalyst and then prepolymerizing prior to introducing the catalyst into a polymerization reaction zone. Another embodiment of the invention includes contacting the catalyst with the co-catalyst for a certain period of time (aging). Test results show an increase in efficiency of the catalyst of up to 6250 gms polymer product/gm catalyst in one hour when it is aged with the co-catalyst as taught by the present invention. In a preferred embodiment, the aged catalyst is prepolymerized prior to being introduced into the reaction zone.

The type of catalyst contemplated for use in the present invention is generally a metallocene catalyst. These catalysts can be generally defined as a cyclopentadienide, i.e., a metal derivative of cyclopentadiene, which has been ionized to form an active cationic metallocene catalyst. The metallocene compound generally contains two cyclopentadienyl rings and is of the general formula:

$R''_b(CpR_{5-b})(CpR'_{5-b}) MR^*_{v-2}$ where R" is a bridge imparting stereorigidity to the structure to the metallocene by connecting the two cyclopentadienyl rings, b is 1 or 0 indicating whether the bridge is present or not, Cp is a cyclopentadienyl ring, R and R' are substituents on the cyclopentadienyl rings and can be a hydride or a hydrocarbyl from 1–9 carbon atoms, each R and R' being the same or different, each $(CpR_{5-b})$ and $(CpR'_{5-b})$ being different so that bilateral symmetry exists, M is a Group IIIB, IVB, VB or VIB metal, R* is a hydride, a halogen or a hydrocarbyl from 1–20 carbon atoms, v is the valence of M. Preferably the bridge R" is present and is a hydrocarbyl biradical of 1–20 carbon atoms. Hydrocarbyl biradicals useful as the bridge in the present catalysts include linear hydrocarbyl biradicals of 1–10 carbon atoms or branched hydrocarbyl biradicals of 2–20 carbon atoms, preferably one carbon atom, which may be substituted or unsubstituted, preferably substituted. The bridge is most preferably diphenylmethyl. $(CpR_{5-b})$ is preferably an unsubstituted cyclopentadienyl ring. $(CpR'_{5-b})$is preferably a substituted cyclopentadienyl ring, more preferably a cyclopentadienyl ring substituted such that the substituents are radicals bonded to adjacent carbon atoms to form a fused ring, most preferably $CpR'_{5-b})$ is a fluorenyl radical. Preferably, M is a Group IVB metal, more preferably, titanium, zirconium or hafnium. R* is preferably a halogen or an alkyl, more preferably, chlorine or methyl.

Bilateral symmetry is defined as the condition in which there are no substituents or one or more substituents on one side and no substituents or one or more substituents on the other side in the same relative position such that a mirror image is formed from one side to another. One example of such a compound is isopropyl (cyclopentadienyl-9-fluorenyl)zirconium dichloride, abbreviated iPr(Cp) (Flu) $ZrCl_2$. An illustration of the ligands of this compound are shown below:

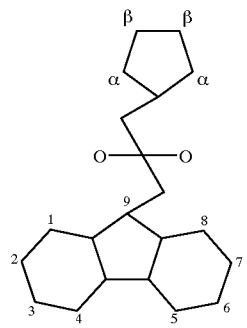

Bilateral symmetry is illustrated by a plane bisecting the zirconium metal and the bridge resulting in the right side of each ligand being a mirror image of its left side. The α and β position of the cyclopentadienyl ring represent the position of possible substituents in the proximal and distal position, respectively, or positions ⅔ and ¾ of the drawing below:

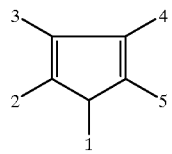

It is believed that bilateral symmetry must exist for the β substituents of the cyclopentadienyl ring but is of less importance and may not be necessary for the α substituents of the cyclopentadienyl ring. It is further believed that bilateral symmetry of substituents of the fluorenyl ring is of less importance and may not be necessary. It is believed that bilateral symmetry of less importance and may not be necessary for the bridge.

The alumoxanes useful in combination with the metallocene compound of the present invention may be represented by the general formula $(R—Al—O—)_n$ in the cyclic form and $R(R—Al—O—)_nAlR_2$ in the linear form wherein R is an alkyl group with one to five carbon atoms and n is an integer from 1 to about 20. Most preferably, R is a methyl group and the preferred alumoxane is methylalumoxane (MAO). The alumoxanes can be represented structurally as follows:

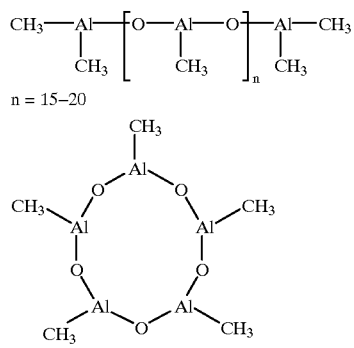

n = 15–20

The support was silica having high surface area and small average pore size. One example of silica operative in this invention is chromatography grade silica. The silica was treated with methylalumoxane (MAO) in the following manner: The silica had water removed to a level of approximately 1.0%. The dried silica was slurried in a nonpolar solvent. A solution of alumoxane in solvent was added to the silica slurry. After heating and subsequently cooling the slurry, the solid (silica treated with alumoxane) was separated out and (optionally) dried.

The metallocene was contacted with the MAO-treated silica to form a supported metallocene catalyst in the following manner: A solution of metallocene in a nonpolar solvent was added to a slurry of silica treated with alumoxane also in a nonpolar solvent, preferably the same solvent as the metallocene solution. The solid, metallocene supported on silica treated with alumoxane, was separated out and dried.

A suspension was formed with the supported metallocene catalyst in an inert liquid carrier, such as mineral oil. The liquid carrier is selected based on the following properties:

1. The liquid does not dissolve the solid catalyst component.
2. The liquid has minimal chemical interaction with the catalyst component.
3. The liquid is preferably an inert hydrocarbon.
4. The liquid only "wets" the catalyst component
5. The liquid has sufficient viscosity to maintain the catalyst component in suspension without excessive agitation. Liquids which would be effective in this invention would be long chain hydrocarbons, such as mineral oil and polyisobutylene. This listing is not intended to be complete and all inclusive but is merely made to show examples of useful liquid media.

A co-catalyst is utilized to aid in the activation of the catalyst for the polymerization reaction. The most commonly used co-catalyst is an organoaluminum compound which is usually an alkyl aluminum. The aluminum alkyl is of the general formula $AlR'_3$ where R' is an alkyl of from 1–8 carbon atoms or a halogen and R' may be the same or different with at least one $R^1$ being an alkyl. Examples of aluminum alkyls are trialkyl aluminums, such as trimethyl aluminum (TMA), triethyl aluminum (TEAl) and triisobutyl aluminum (TiBAl). The organoaluminum may also be a dialkylaluminum halide, such as diethyl aluminum chloride (DEAC), or an alkylaluminum dihalide. The preferred co-catalyst is an aluminum trialkyl, specifically triisobutyl aluminum ("TIBAl").

In order to increase the efficiency of the catalyst, the catalyst is pre-polymerized. Basically, the prepolymerization reaction occurs as a monomer is introduced into a mixture of catalyst and co-catalyst. The monomer is polymerized, and in so doing, it adheres to the surface of the catalyst and forms a coating. Any known method for prepolymerizing a catalyst can be used for the catalyst of the present invention.

In pre-polymerizing the catalyst, a weight ratio of polymer/catalyst of approximately 0.01–3.0 is desirable. Preferably, the weight ratio of polymer to catalyst is greater than 1.0. The preferred range of polymer coating to catalyst is approximately 2.0–3.0.

According to one embodiment of the invention, the supported metallocene catalyst is contacted with a co-catalyst and then is prepolymerized by contact with the monomer prior to being introduced into a polymerization reaction zone which contains additional monomer. In a preferred embodiment, the contact of the catalyst with the co-catalyst occurs in a holding tank in which the catalyst/co-catalyst mixture is allowed to age for 1 hour to 720 hours (30 days), preferably 18 to 48 hours and more preferably 12 to 24 hours. The catalyst/co-catalyst mixture may be fed into the reactor in a continuous or periodic manner.

The contact of the catalyst/co-catalyst mixture with the monomer for prepolymerization can take place in a pipe which carries the catalyst into the polymerization zone. The contact time or residence time of the catalyst in the pipe need be only a few seconds. A minimum of three seconds of pre-contact between the catalyst/co-catalyst and the monomer is sufficient to significantly increase the efficiency of the catalyst. The concentration of co-catalyst in the stream may be varied as the co-catalyst is transferred into the polymerization reaction zone. A preferred concentration would be less than 10% co-catalyst. All of the co-catalyst necessary for the polymerization reaction in the reaction zone need not be fed through this contact pipe. A portion of the desired amount of co-catalyst in the reactor may be added directly to the reaction zone.

It was found that there was a relationship between aging the catalyst in aluminum alkyl and prepolymerization in so far as obtaining polymer product with desirable morphology. The morphology of the polymer product is a function of the particle size, particle shape and the particle size distribution of the catalyst particles. In most processing applications it is desirable for the polymer to have morphology in which the particle are granular rather than agglomerated. To obtain these granular particles it was found that the aging time of the catalyst in aluminum alkyl could be decreased or eliminated if the prepolymerization time was increased and, conversely, the prepolymerization could be decreased (but not eliminated) as the aging time increased. In addition, it was found that the amount of aluminum alkyl used in aging the catalyst affected polymer morphology. As the relative amount of aluminum alkyl was increased for the same aging time period, the morphology improved.

The invention having been generally described, the following examples are given as particular embodiments of the invention and to demonstrate the practice and advantages thereof. It is understood that the examples are given by way of illustration and are not intended to limit the specification or the claims to follow in any manner.

Preparation of the Metallocene

A manipulations were carried out under argon using standard Schlenk techniques unless otherwise noted.

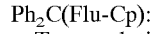
$Ph_2C(Flu-Cp)$:

To a solution of 50g fluorene in 200 ml anhydrous tetrahydrofuran at room temperature was added dropwise at 0° C., 207 ml of a 1.6 molar solution of n-butyllithium in hexane. The reaction mixture was stirred for 1 hr at room temperature and cooled to −78° C. upon which light brown solid precipitated. 69.3 g of diphenylfulvene was then added to the reaction mixture. The heterogeneous mixture was allowed to gradually come to room temperature with constant stirring and was stirred at room temperature overnight (~18 hrs). The reaction mixture was cooled to 0° C. and cautiously quenched with dilute hydrochloric acid (10 to 18%) (slightly exothermic). The mixture was stirred at 0° C. for 5 minutes and diluted with 300 ml water and 200 ml hexane and filtered through a medium frit funnel. The resulting solid was washed with water (500 ml) followed by hexane (300 ml). The resulting wet solid was air dried followed by drying under vacuum with slight warming. To completely remove entrapped solvent the sample was heated at 100° C. under high vacuum overnight. The yield of THF- and water-free ligand was in the range 70–80%.

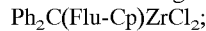
$Ph_2C(Flu-Cp)ZrCl_2$;

A three-necked 3L flask equipped with mechanical stirrer and pressure equalized addition funnel was charged with 73.2 g of rigorously dried ligand obtained from the previous method (It should be noted that, the ligand must be dry but not necessarily free of THF. In case, THF-free ligand is used, it appears that it may be advantageous to use excess of n-butyllithium to complete dianion formation). One liter of anhydrous ether was added and the stirring initiated. The slurry was cooled to 0° C., and 254.2 ml of 1.6 molar n-butyllithium in hexane was added dropwise cautiously. The temperature of the reaction mixture was gradually allowed to come to room temperature and stirred overnight (~18h). The stirring was stopped and the solid was allowed to settle. The supernatant was decanted. The resulting solid was washed with two portions of anhydrous hexane (2×500 ml). A fresh batch of 1.0 L of anhydrous hexane was added and the stirring was initiated. The reaction mixture was cooled to 0° C. and 42 g of $ZrCl_4$ was added in small portions. The temperature was allowed to come to room temperature and stirred overnight (18h). The stirring was stopped and the solid allowed to settle. The supernatant was decanted and the solid dried under vacuum. Total weight, 112 g (contains LiCl).

Purification Method 112 g of the crude product was added to a 3L, 3 neck-flask and 2 L amylene-free chloroform (amylene present as a preservative in chloroform was removed either by purging with argon for 20 min or by removal under vacuum for a few minutes followed by release of vacuum with argon and repetition of the process 3–4 times) was added. The mixture was magnetically stirred at room temperature for 45 min; the stirring stopped and the flask was placed in a warm water bath. The solid suspension was allowed to settle. Using a cannula, the supernatant was filtered through a fritted funnel packed (⅔ full) with glasswool. After the filtration was complete the remaining solid was rinsed with additional $CHCl_3$ (or until the undissolved solid is pale colored) and the washings were filtered into the receiving flask. The solvent was removed from the filtrate and the resulting bright red solid, 101 g (>95% of theoretical recovery), was stored in the drybox.

MAO Treatment of Silica 500 g of silica (Fuji-Davison—Chromatography Grade) was dried at 200° C. in vacuo for two hours. Water content of the silica was determined by heating a sample of the dried silica to 300° C. and calculating the percent loss of weight (approximately 0.5–1.0%. Toluene (1.5 L) was added and the slurry stirred at room temperature. 1500 mL of a solution of 30% by weight of MAO in toluene was then added to the silica slurry. The slurry was then heated to reflux for 4 hours. After cooling to room temperature, the supernatant was decanted by cannula and the solid washed four times each with 500 mL portions of toluene. The solid was then dried in vacuo overnight at 80° C.

Supporting of Metallocene on MAO-Treated Silica

A toluene solution of metallocene [diphenylmethyl cyclopentadienyl-9-fluorenylzirconium dichloride, abbreviated $Ph_2C(Flu-Cp)ZrCl_2$–16 g] was added via cannula to a stirred slurry of $MAO/SiO_2$ from the previous procedure (approximately 800 grams) in 2 L toluene. Upon contact with the $MAO/SiO_2$, the red metallocene turns the solid deep purple. The slurry was stirred for one hour at room temperature. The supernatant liquid was decanted and the solid washed three times each with 500 mL hexane. The purple solid was then dried overnight in vacuo at room temperature.

The following Examples and Comparative Examples illustrate the present invention in more detail and the advantages to be gained in increased catalyst efficiency by introducing a pre-polymerized catalyst into a reaction zone.

EXAMPLE I

A slurry of 180 mg solid catalyst component and 540 mg of triisobutylaluminum (TIBAl) was prepared in 5.0 ml mineral oil. A one ml aliquot was added to a 2.0 liter autoclave from which the air had been sufficiently replaced by nitrogen. The autoclave was then charged with 1.4 liters of liquid propylene and 16 mmoles of gaseous hydrogen. The mixture was then heated to 60° C. and maintained for 60 minutes. The polymer was then dried at 80° C. Polymerization results are shown in Table 1.

| Polymerization | |
| --- | --- |
| Reagents | Conditions |
| Catalyst: 36 mg | Temperature: 60° C. |
| TIBAl: 108 mg | Time: 1 hour |
| Propylene: 1.4 L (0.72 kg) | |
| Hydrogen: 16 mmol | |

EXAMPLE II

Approximately 16 mmoles of hydrogen were added to an empty (under ~2 psig nitrogen) and dry 2 L Zipperclave reactor followed by 1.0 L of propylene. The reactor was heated to 60° C. and stirred at approximately 1000 rpm. A slurry of 180 mg solid catalyst component was prepared and mixed with 540 mg of triisobutylaluminum (TIBAl) in 5.0 ml mineral oil. A one ml aliquot was precontacted with a small amount of propylene at room temperature for five seconds. The catalyst was then charged into the reactor.

Polymerization continued for one hour during which time the reactor was maintained at the polymerization temperature. At the end of this time polymerization was terminated by rapidly venting the reactor of unreacted monomer. The polymer yield and analysis is shown in Table I.

EXAMPLE III

Approximately 16 mmoles of hydrogen (DP=120 psig from a 48.7 Ml bomb) were added to an empty (under ~2 psig nitrogen) and dry 2 L Zipperclave reactor followed by 1.0 L of propylene. The reactor was heated to 60° C. and stirred at approximately 1000 rpm. A slurry of 108 mg solid catalyst component and 45 mg of triisobutylaluminum (TIBAl) in 5.0 ml mineral oil were prepared and aged for one day. One ml of the mineral oil slurry was precontacted with 99 mg of TIBAl. The catalyst was then charged into the reactor.

Polymerization continued for one hour during which time the reactor was maintained at the polymerization temperature. At the end of this time polymerization was terminated by rapidly venting the reactor of unreacted monomer. The polymer yield and analysis is shown in Table I.

EXAMPLE IV

The same procedure of Example III was used except 60 mg of TIBAl was used for aging. The polymer yield and analysis is shown in Table I.

EXAMPLE V

Approximately 16 mmoles of hydrogen (DP=120 psig from a 48.7 Ml bomb) were added to an empty (under ~2 psig nitrogen) and dry 2 L Zipperclave reactor followed by 1.0 L of propylene. The reactor was heated to 60° C. and stirred at approximately 1000 rpm.

A slurry of 108 mg solid catalyst component and 45 mg of triisobutylaluminum (TIBAl) in 5.0 ml mineral oil was prepared and aged for two days. A one ml aliquot of the mineral oil slurry was mixed with 99 mg of TIBAl. The mineral oil/TIBAl mixture was precontacted with a small amount of propylene for 5 seconds. The catalyst was then charged into the reactor.

Polymerization continued for one hour during which time the reactor was maintained at the polymerization temperature. At the end of this time polymerization was terminated by rapidly venting the reactor of unreacted monomer. The polymer yield and analysis is shown in Table I.

EXAMPLE XIII

The same procedure of Example V was used except 135 mg of TIBAl was used for aging, the aging was one day and the precontact time was 10 seconds.

EXAMPLE XIV

The same procedure of Example V was used except 180 mg of TIBAl was used for aging, the aging was one day and the precontact time was 10 seconds.

TABLE I

| Example # | TIBAL mg | Aging (days) | Prepoly (sec) | Yield (g) | Efficiency (g sPP/g cat) | Bulk Density (g/cc) | Melt Flow (g/10 min) | Morphology |
|---|---|---|---|---|---|---|---|---|
| 1. | 0 | — | 0 | 125 | 3472 | 0.32 | 0.56 | Agglomerate |
| 2. | 0 | — | 5 | 127 | 3528 | 0.32 | 0.56 | Agglomerate |
| 3. | 45 | 1 | 0 | 146 | 4056 |  | 0.56 | Agglomerate |
| 4. | 60 | 1 | 0 | 130 | 3611 |  | — | Agglomerate |
| 5. | 45 | 2 | 5 | 132 | 3667 |  | 0.60 | Agglomerate |
| 6. | 60 | 2 | 5 | 126 | 3500 |  | 0.68 | Agglomerate |
| 7. | 45 | 2 | 10 | 128 | 3556 | 0.32 | 0.72 | Granules |
| 8. | 60 | 2 | 10 | 108 | 3000 | 0.31 | 0.70 | Granules |
| 9. | 135 | 1 | 0 | 145 | 4028 | 0.35 | 0.58 | Agglomerate |
| 10. | 180 | 1 | 0 | 146 | 4056 |  | 0.66 | Agglomerate |
| 11. | 135 | 1 | 5 | 145 | 4028 | 0.34 | 0.70 | Agglomerate |
| 12. | 180 | 1 | 5 | 128 | 3556 | 0.32 | 0.62 | Granules & Agglomerate |
| 13. | 135 | 1 | 10 | 192 | 5333 | 0.32 | 0.68 | Granules |
| 14. | 180 | 1 | 10 | 225 | 6250 | 0.35 | — | Granules |

EXAMPLE VI

The same procedure of Example V was used except 60 mg of TIBAl was used for aging.

EXAMPLE VII

The same procedure of Example V was used except the precontact time was 10 seconds.

EXAMPLE VIII

The same procedure of Example V was used except 60 mg of TIBAl was used for aging and the precontact time was 10 seconds.

EXAMPLE IX

The same procedure of Example III was used except 135 mg of TIBAl was used.

EXAMPLE X

The same procedure of Example III was used except 180 mg of TIBAl was used.

EXAMPLE XI

The same procedure of Example V was used except 135 mg of TIBAl was used for aging and the aging was one day.

EXAMPLE XII

The same procedure of Example V was used except 180 mg of TIBAl was used for aging and the aging was one day.

Polymer morphology is related to the prepolymerization time. The desired polymer morphology was obtained with a prepolymerization of at least 10 seconds. Polymer morphology is related to the amount of aluminum alkyl used in aging the catalyst. The desired polymer morphology was obtained with a catalyst aged in an aluminum alkyl to catalyst weight ratio of approximately 1:1 when triisobutyl aluminum was used as the aluminum alkyl.

Catalyst efficiency is related to activation of the catalyst with aluminum alkyl. Catalyst efficiency improved when the catalyst was aged in aluminum alkyl. In addition, catalyst efficiency is related to prepolymerization. Catalyst efficiency improved when the catalyst was prepolymerized at least 10 seconds, especially when the catalyst was aged in an aluminum alkyl to catalyst weight ratio of approximately 1:1 when triisobutyl aluminum was used as the aluminum alkyl.

The drawing is a schematic illustration showing the prepolymerization system of the present invention set up for the supply of prepolymerized catalyst to a continuous flow-type polypropylene reactor. The continuous flow reactor 2 normally will take the form of a loop 4 equipped with an impeller 5. As will be understood by those skilled in the art the impeller functions to circulate the polymerization reaction mass continuously through the loop at controlled temperature and pressure conditions. The polymer product is withdrawn from the reactor via line 6.

A carrier stream for the prepolymerization reactor is initially established by the supply of a suitable solvent for the catalyst to a mixing line 8. The organic solvent, such as mineral oil, is supplied to the mixing line via line 9. TIBAl supplied to the carrier fluid from suitable sources (not shown) via lines 11 and 12, respectively. After addition of the co-catalyst, the catalyst is supplied to the carrier fluid via line 14. The catalyst may be supplied by any suitable procedure, either continuously or intermittently. The carrier fluid containing the catalyst components is then supplied to a tubular reactor 16 where it is mixed with liquid propylene supplied, for example, by a secondary line 18 leading from a main propylene supply line 19. The amount of propylene supplied to the prepolymerization reactor 16 is relatively small in comparison to the amount of propylene supplied via the main supply line 19 to the polymerization reactor 2. The propylene supplied to the prepolymerization reactor 16 and also the main reactor 2 normally will have small amounts of hydrogen entrained therein.

As noted previously, because of the perceived slow reaction time of the prepolymerization reaction, the residence times of the propylene and catalyst components in prior art prepolymerization reactors are normally on the order of minutes or even hours. Also the capacity of the prepolymerization reactor in a commercial unit is fairly substantial, normally on the order of 200 liters or more. In the present invention, the residence time of the reaction mixture within the prepolymerization reactor 16 is less than a minute and, as practical matter on the order of several seconds, and the volume capacity of the prepolymerization reactor will be quite small, normally less than 1 liter. For most applications of the invention, the residence time within the prepolymerization reactor is approximately three seconds. The temperature of the tubular reactor is less than the polymerization temperature but sufficient to prepolymerize the catalyst and is preferably no greater than 30° C.

The drawing illustrates the preferred order of addition of the catalyst components to the carrier stream. That is, it is desirable that the catalyst which already contains the co-catalyst be added to the carrier stream.

In a specific embodiment of the invention, the catalyst component is supplied to an elongated tubular prepolymerization reactor of extremely low capacity which is operated at a residence time of approximately three seconds.

In this embodiment, reaction chamber 16 is defined by a 50–200 feet long tubing having an internal diameter of ⅜ inch and is preferably 100 feet. The flow rate is adjusted to provide for a residence time within the tubing of approximately three seconds.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of the U.S. of America is:

1. A process of treating silica with an alumoxane comprising:

removing water from the silica to a level of 0.5–1.08 percent by weight;

slurrying the silica in a nonpolar solvent;

adding a solution of alumoxane in solvent to the silica slurry;

heating to reflux and subsequently cooling the slurry to room temperature; and separating a solid silica treated with alumoxane from the slurry.

2. A process as in claim 1 wherein the silica is chromatography grade silica.

3. A process as in claim 1 wherein the alumoxane is represented by the general formula $(R-Al-O-)_n$ in the cyclic form and $R(R-Al-O-)_n AlR_2$ in the linear form wherein R is an alkyl group with one to five carbon atoms and n is an integer from 1 to about 20.

4. A process as in claim 1 wherein the alumoxane is methylalumoxane.

5. A process as in claim 1 wherein the nonpolar solvent is toluene.

6. A process as in claim 1 wherein after the solid silica treated with alumoxane is separated from the slurry additionally comprising:

drying the solid silica treated with alumoxane.

7. A process of treating silica with an alumoxane consisting essentially of:

removing water from the silica to a level of 0.5–1.08 percent by weight;

slurrying the silica in a nonpolar solvent;

adding a solution of alumoxane in solvent to the silica slurry;

heating to reflux and subsequently cooling the slurry to room temperature; and separating a solid silica treated with alumoxane from the slurry.

* * * * *